(12) United States Patent
Brickell

(10) Patent No.: US 8,631,507 B2
(45) Date of Patent: Jan. 14, 2014

(54) METHOD OF USING SIGNATURES FOR MEASUREMENT IN A TRUSTED COMPUTING ENVIRONMENT

(75) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1611 days.

(21) Appl. No.: 11/390,920

(22) Filed: Mar. 27, 2006

(65) Prior Publication Data

US 2007/0226505 A1    Sep. 27, 2007

(51) Int. Cl.
*H04L 9/00* (2006.01)
(52) U.S. Cl.
USPC .......................................................... 726/30
(58) Field of Classification Search
USPC ................... 700/1; 707/8; 713/189, 193, 194; 717/136; 726/30, 26
See application file for complete search history.

(56) References Cited

U.S. PATENT DOCUMENTS

| | | | | |
|---|---|---|---|---|
| 2003/0120935 | A1* | 6/2003 | Teal et al. | 713/188 |
| 2003/0188179 | A1* | 10/2003 | Challener et al. | 713/193 |
| 2005/0021968 | A1* | 1/2005 | Zimmer et al. | 713/176 |
| 2005/0060568 | A1* | 3/2005 | Beresnevichiene et al. | 713/200 |
| 2005/0229011 | A1* | 10/2005 | Ebringer et al. | 713/189 |
| 2005/0234909 | A1* | 10/2005 | Bade et al. | 707/8 |
| 2007/0006183 | A1* | 1/2007 | Mensch et al. | 717/136 |
| 2007/0073416 | A1* | 3/2007 | Grawrock | 700/1 |

OTHER PUBLICATIONS

Trusted Computing Platform Alliance, Main Specification Version 1.1b, 332 pages, Feb. 22, 2002.

* cited by examiner

*Primary Examiner* — Ellen Tran
(74) *Attorney, Agent, or Firm* — Grossman, Tucker, Perreault & Pfleger, PLLC

(57) ABSTRACT

Verification of an encrypted blob of data passed to a sealed storage function in a trusted platform module (TPM) of a computing platform by a software component, may be accomplished by receiving the encrypted blob of data and a digital signature for each of a set of platform configuration register (PCR) indicators and PCR value pairs from the software component. The encrypted blob of data may be decrypted using a TPM key to form a decrypted blob of data, the decrypted blob of data including a secret and a verification key. For each received digital signature of the set of PCR identifier and PCR value pairs, it may be determined if each received digital signature verifies using the verification key and rejecting the decrypted blob of data when any signature is not verified. For each received digital signature of the set of PCR identifier and a PCR value pairs, it may be determined if each received PCR value matches a current value stored in a corresponding PCR in the TPM and rejecting the decrypted blob of data when any corresponding pair of PCR values do not match. The secret may be output from the decrypted blob of data when the decrypted blob of data has not been rejected.

24 Claims, 10 Drawing Sheets

METHOD OF USING SIGNATURES FOR MEASUREMENT IN A TRUSTED COMPUTING ENVIRONMENT

BACKGROUND

1. Field

The present invention relates generally to computer security and, more specifically, to using digital signatures of platform components as a measurement of trust in a computing environment.

2. Description

A Trusted Platform Module (TPM) is a component of a trusted computing platform as defined by the Trusted Computing Group. The TPM, which is used as a root of trust for a computing platform, has a set of Platform Configuration Registers (PCRs), and at least one public/private key pair. During the boot of a trusted computing environment, a root of trust component will load a software module, compute the hash of the software module, send the hash to a PCR, and then transfer control to that software module. The software module may then repeat this process with a new software module, and may send the hash of the new software module to a new PCR, or it may extend the hash of a PCR that was previously used. This process may be repeated many times. In the end, there are one or more PCRs that have a measurement of all the software that is in control of the trusted computing environment.

Sealed storage is one of the features of a trusted computing platform. The TPM may encrypt a portion of data called a blob, which consists of a set of PCR values and a secret. Later, when the blob is presented to the TPM for decryption, the TPM will decrypt it, and check whether the PCR values specified in the blob are the same as the PCR values that are currently stored in the PCRs in the TPM. Only if this check passes will the TPM release the decrypted secret to the platform. Thus the sealed secret is only available to the computing environment specified by the blob. If some other environment has launched on the computing platform, then the TPM will not release the secret.

One problem with making sealed secrets work in practice is that there are many legitimate reasons for changing some portion of the computing environment on the platform. In this case, the sealed secret would need to be migrated to the new environment. This could be accomplished by first launching the old environment that was the same as the environment specified in the encryption blob. The secret in the blob would be released to this environment. The PCR values that will correspond to the new environment would be calculated. Then the secret and the new PCR values would be given to the TPM with an instruction to create a new blob with the same secret and the new PCR values.

This process works fine if the application that requires the sealed secret is aware of any changes in the environment. However, if the environment has changed without the sealed secret having been migrated, then there is a problem. Because for the application to be able to recover the sealed secret, the application would have to get the old environment launched. This is particularly a problem if the environment includes the basic input/output system (BIOS) and option read only memories (ROMs).

BRIEF DESCRIPTION OF THE DRAWINGS

The features and advantages of the present invention will become apparent from the following detailed description of the present invention in which.

DETAILED DESCRIPTION

One of the features provided for in a trusted computing environment is obtaining a measurement of the current environment of the computing platform. This measurement includes, at least in part, a cryptographic hash of the firmware and the operating system. The measurement may also include hashes of other software components. The measurement may be used for sealed storage and can also be used for reporting on the environment to an external party. One of the problems with implementing trusted computing is that each time the environment is updated or modified, the measurement will change, and thus secrets need to be migrated to the new environment. An embodiment of the present invention is a method of using digital signatures of the software components in the environment instead of the hashes of the components to mitigate this migration problem.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
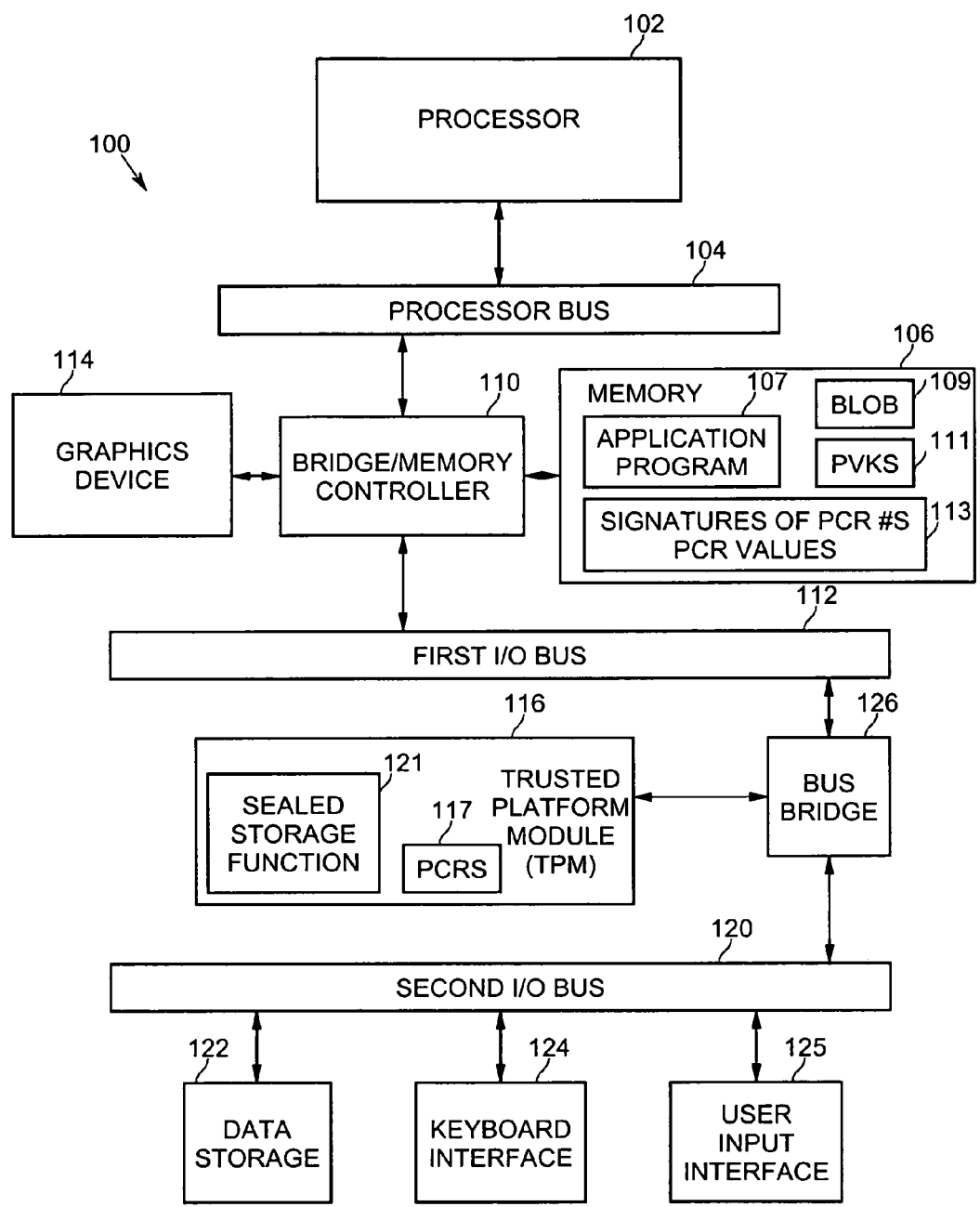
FIG. 1 is a diagram illustrating a processing system having a trusted platform module (TPM) according to an embodiment of the present invention.

An exemplary processing system for embodiments of the present invention is shown in FIG. 1, however, other systems may also be used and not all components of the processing system shown are required for the present invention. Sample system 100 may be used, for example, to execute the processing for embodiments of the present invention. Sample system 100 is representative of processing systems based on the PENTIUM®, CORE, CORE DUO, or Celeron® family of processors available from Intel Corporation, although other systems (including personal computers (PCs) or servers having other processors, engineering workstations, other set-top boxes, and the like) and architectures may also be used.

FIG. 1 is a block diagram of a system 100 of one embodiment of the present invention. The system 100 includes a processor 102 that processes data signals. Processor 102 may be coupled to a processor bus 104 that transmits data signals between processor 102 and other components in the system 100. System 100 includes a memory 106. Memory 106 may store instructions and/or data represented by data signals that may be executed by processor 102. The instructions and/or data may comprise code for performing any and/or all of the techniques of the present invention. Memory 106 may also contain additional software and/or data such as at least one application program 107. Additionally, memory may store at least one data structure called a blob 109, a public verification key (PVK) of a Software Component Signing Service, SCSS-$_{VERIFY}$ 111, and signatures of a set of platform configuration register (PCR) numbers and associated PCR values 113.

A bridge/memory controller 110 may be coupled to the processor bus 104 and memory 106. The bridge/memory controller 110 directs data signals between processor 102, memory 106, and other components in the system 100 and bridges the data signals between processor bus 104, memory 106, and a first input/output (I/O) bus 112. In this embodiment, graphics device 114 interfaces to a display device (not shown) for displaying images rendered or otherwise processed by the graphics device 114 to a user. First I/O bus 112 may comprise a single bus or a combination of multiple buses. First I/O bus 112 provides communication links between components in system 100.

In at least one embodiment, a trusted platform module (TPM) 116 may be coupled to bus bridge 126. A TPM comprises circuitry included within a processing system to support trusted computing. A TPM has been defined by the Trusted Computing Group (TCG) in the Trusted Computing Platform Association (TCPA) Main Specification 1.2, February 2002, and successive versions, available from the TCG. A TPM operates somewhat like a "smart card" on a motherboard of a computer system (such as a personal computer (PC)), to provide various security functions to the system. There is usually only one TPM per system. The TPM includes at least one public/private key pair for use in cryptographic operations, can generate anonymous key pairs for use by other entities within the system, can perform encryption and decryption operations, can sign and verify data, and can establish a root of trust for the system. The TPM is considered to be difficult to break into and affect its operations. In embodiments of the present invention, TPM 116 includes one or more PCRs 117 and sealed storage function 121. Each PCR stores data used for controlling and configuring the processing system and may be identified by an identifier (e.g., a number, a text string, etc.). The sealed storage function provides at least encryption and decryption services for the TPM.

In one embodiment, when the processing system is booted up, during the boot sequence measurements of various software components (such as the BIOS, option ROMs, and so on) may be registered into one or more PCRs. In one embodiment, the measurement comprises a cryptographic hash of the code of the component. In one embodiment, each PCR has a default value, for example O, after a reset. The PCR can only be extended. That is, when the TPM is given the hash H of a software component to register into a PCR, the TPM computes a new, extended value of the PCR as the New Value of PCR=HASH (old value of PCR∥H), where ∥ is the concatenation function.

The blob 109 comprises an encrypted data structure to store at least one secret and one or more other values. The blob becomes a representation of the measurements of the current computing environment. When a component is changed in the processing system (for example, when a new graphics card and associated device driver are installed), then the blob will not correspond to the changed environment and the blob must be migrated to the new environment.

A second I/O bus 120 may comprise a single bus or a combination of multiple buses. The second I/O bus 120 provides communication links between components in system 100. A data storage device 122 may be coupled to the second I/O bus 120. A keyboard interface 124 may be coupled to the second I/O bus 120. A user input interface 125 may be coupled to the second I/O bus 120. The user input interface may be coupled to a user input device, such as a remote control, mouse, joystick, or trackball, for example, to provide input data to the system. A bus bridge 126 couples first I/O bridge 112 to second I/O bridge 120.

Embodiments of the present invention are related to the use of the system 100 as a component in a processing system. According to one embodiment, such processing may be performed by the system 100 in response to processor 102 executing sequences of instructions in memory 106. Such instructions may be read into memory 106 from another computer-readable medium, such as data storage device 122, for example. Execution of the sequences of instructions causes processor 102 to execute processing for the application according to embodiments of the present invention. In an alternative embodiment, hardware circuitry may be used in place of or in combination with software instructions to implement portions of embodiments of the present invention. Thus, the present invention is not limited to any specific combination of hardware circuitry and software.

The elements of system 100 perform their conventional functions in a manner well-known in the art. In particular, data storage device 122 may be used to provide long-term storage for the executable instructions and data structures for embodiments of components in accordance with the present invention, whereas memory 106 is used to store on a shorter term basis the executable instructions of embodiments of components in accordance with the present invention during execution by processor 102.

An embodiment of the present invention includes a new trust model for trusted computing. It provides for a secret to be sealed to a public verification key (PVK) of a Software Component Signing Service SCSS$_{VERIFY}$ 111, so that the TPM 116 can make the sealed secret available to any computing environment signed by a corresponding signature key. In one embodiment, there are one or more Software Component Signing Services (SCSS) (not shown in FIG. 1). An SCSS has one or more software component signature/verification key pairs (SCSS$_{SIGN}$, SCSS$_{VERIFY}$). A signature/verification key pair is a private/public key pair of a digital signature system such as the RSA digital signature system. The SCSS will sign some software components with some of the keys SCSS$_{SIGN}$. The SCSS may have different policies for different keys concerning which software components will be signed with that key. For instance, the SCSS may require a higher level assurance in the correctness of a software component to sign with some keys.

In one embodiment, some software components include meta information which contains the signature by an SCSS-$_{SIGN}$, and also contains the corresponding verification key SCSS$_{VERIFY}$.

In one embodiment, the above meta information is not used for some components, and the software components are measured, and the hash of each measured software components is stored or extended into a PCR. When this is the case, this may be called a hashed PCR.

In one embodiment, during the software component measurement process, as each software component is measured, the signature on the software component is verified using the key $SCSS_{VERIFY}$. Then, instead of storing or extending the cryptographic hash of the software component into the PCR, the hash of the key $SCSS_{VERIFY}$ is stored or extended. If the hash of $SCSS_{VERIFY}$ has already been extended into the PCR, there is no need to extend by this hash value again. If all of the software components provided for the PCR have all been signed by a single $SCSS_{VERIFY}$, then the PCR will contain the result of the default PCR extended by the hash of $SCSS_{VERIFY}$. For a PCR in which the hash of the verification keys are stored or extended, this may be called a keyed PCR.

In one embodiment, some PCRs may be hashed PCRs, and some may be keyed PCRs. As a software environment is launched, some of the components can be measured into a hashed PCR, and some measured and signature verified into a keyed PCR. It is also clear that a single PCR could be a combination of a hashed and a keyed PCR.

A blob may be presented by a software program executing on the computing platform that was originally launched after some measured environment was launched. The software program creates a secret, and wants to seal this secret using the TPM so that the secret will be available later only to a restricted set of other software environments.

Figure 2:
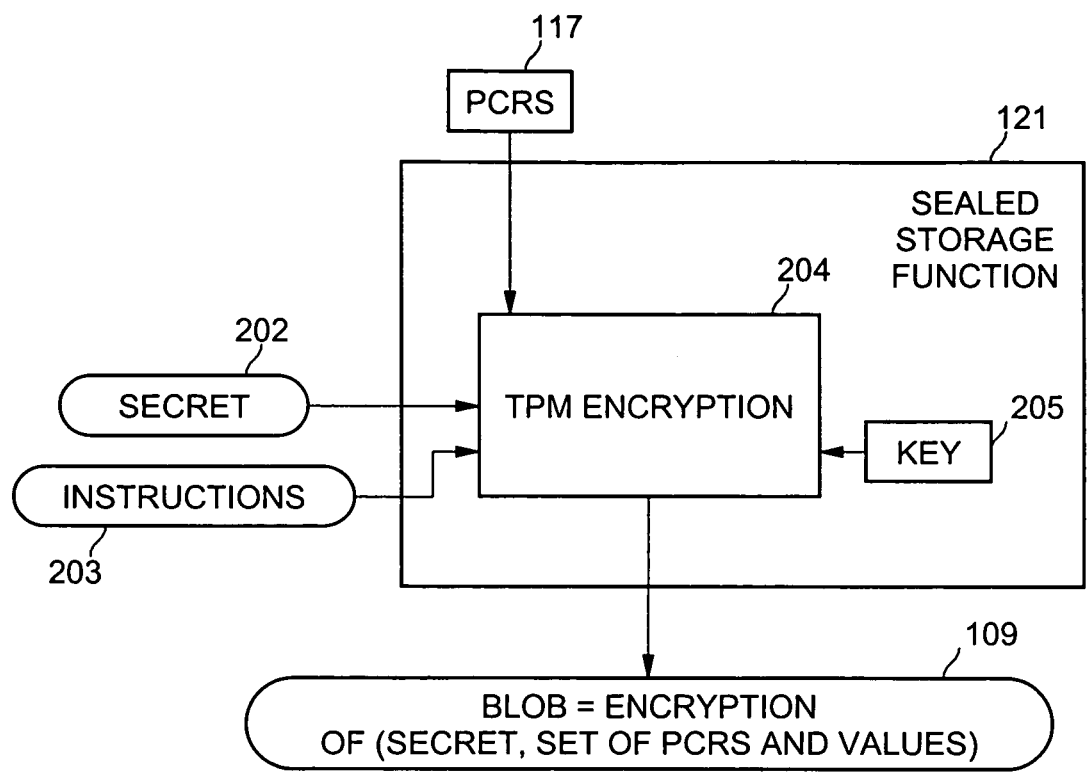
FIG. 2 is a prior art diagram illustrating encryption of a blob.

In one known system as shown in FIG. 2, the TPM is given a secret 202 to encrypt along with a set of keyed PCRs, and instructions 203 to use the current values in the keyed PCRs 117 for the blob. In this case, the TPM will encrypt the secret 202, using key 205, along with the list of the PCRs specified by the instructions, and the current values of those PCRs 117.

Figure 3:
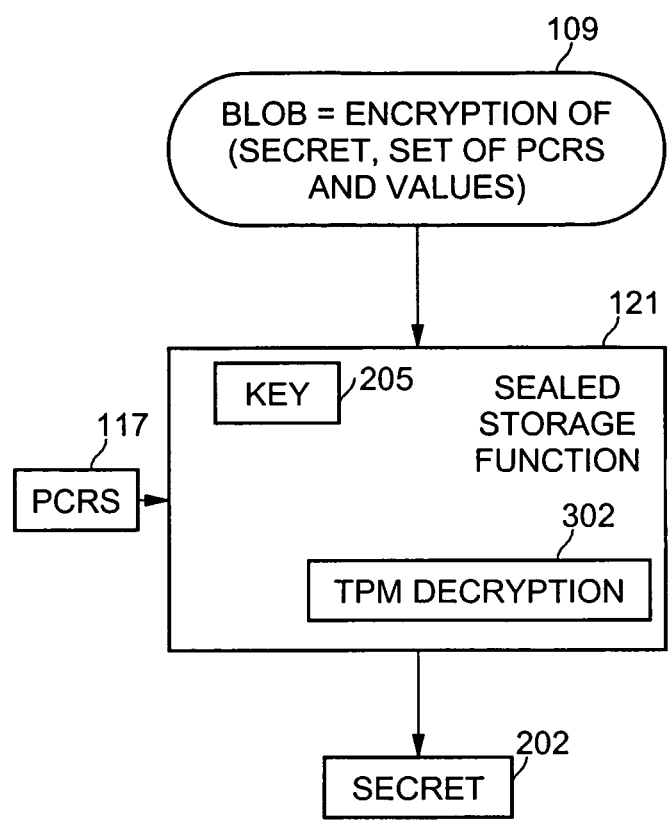
FIG. 3 is a diagram illustrating decryption of a blob as generated by the process shown in FIG. 2 according to an embodiment of the present invention.

FIG. 3 is a diagram illustrating decryption of a blob generated by the process shown in FIG. 2 according to an embodiment of the present invention. When the TPM is given a blob 109 to decrypt by a software environment, the TPM decryption component 302 of the sealed storage function 121 of the TPM decrypts the blob, and then looks at the PCRs specified in the blob to assure that the values currently in those PCRs 117 are exactly the same as the values specified in the blob. Only in this case would the TPM release the secret in the blob to the software environment.

Figure 4:
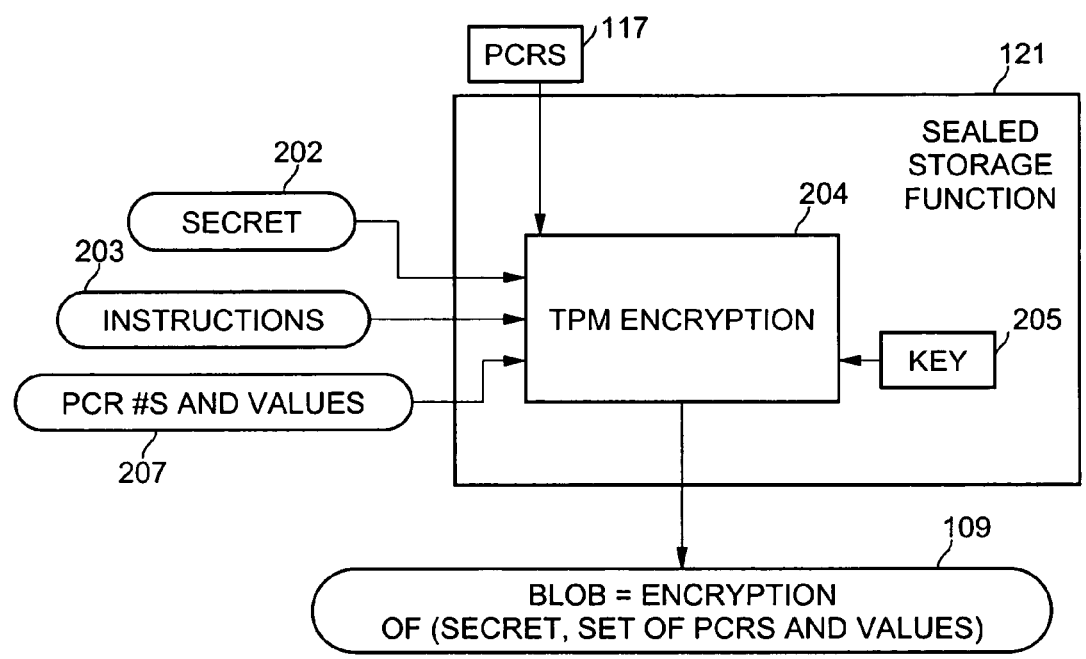
FIG. 4 is a diagram illustrating encryption of a blob according to an embodiment of the present invention.

In an embodiment of the present invention as shown in FIG. 4, the TPM is given a secret 202 to encrypt, a set of keyed PCRs and a list of specified values for the set of keyed PCRs 207, and instructions 203 to use the specified values in the keyed PCRs for the blob. In this case, the TPM will encrypt the secret 202, using key 205, along with the set of the specified PCRs and their specified values. The blob 109 may then be stored in memory 106 for future use.

Figure 5:
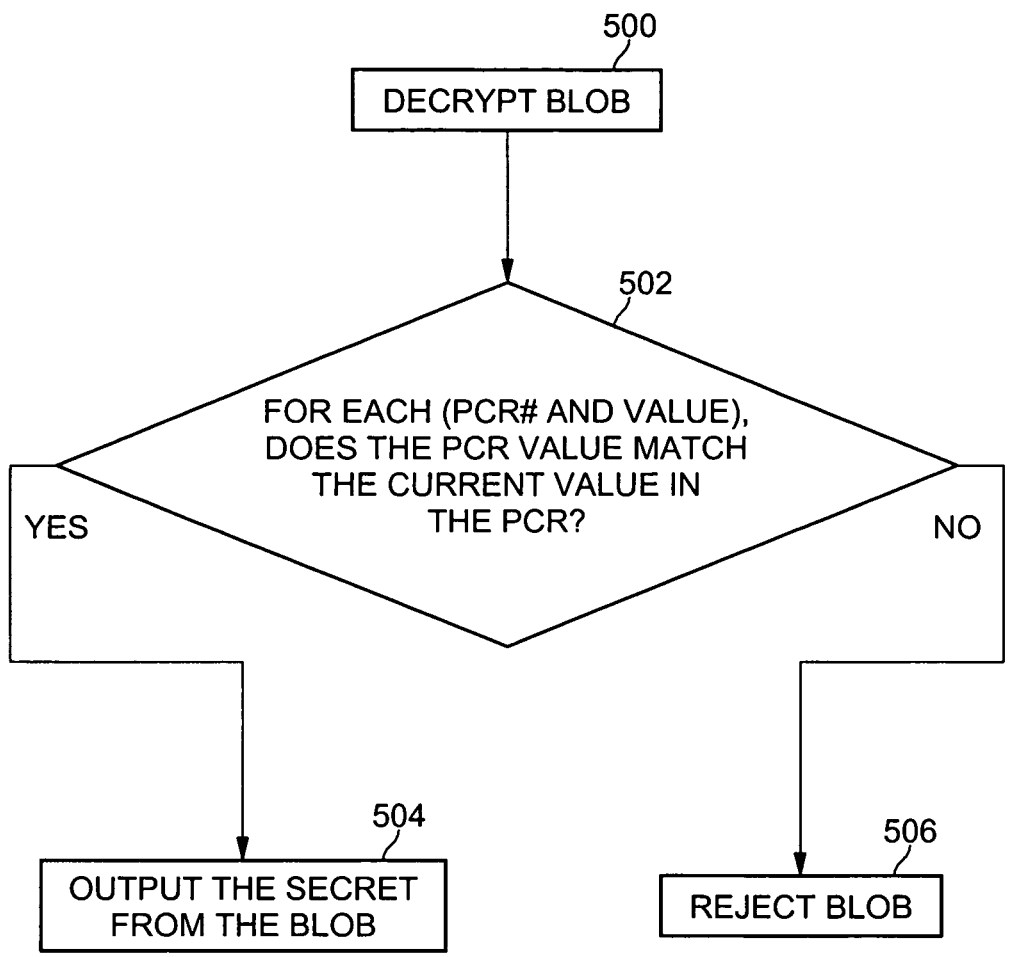
FIG. 5 is a flow diagram illustrating blob verification processing for a blob generated by the process of FIG. 4 according to an embodiment of the present invention.

FIG. 5 is a flow diagram illustrating blob verification processing for a blob according to an embodiment of the present invention. This is the flow for decrypting a blob with keyed PCRs as generated by the process shown in FIG. 4. At block 500, the TPM decryption component of the sealed storage of the TPM decrypts the blob 109 using the key 205. At block 502, the TPM decryption component compares each PCR value included in the blob to the currently stored value in the corresponding PCR 117 in the TPM. If all PCR values match, then the secret is output at block 504. If any one of the PCR values does not match, then the blob is rejected at block 506.

Figure 6:
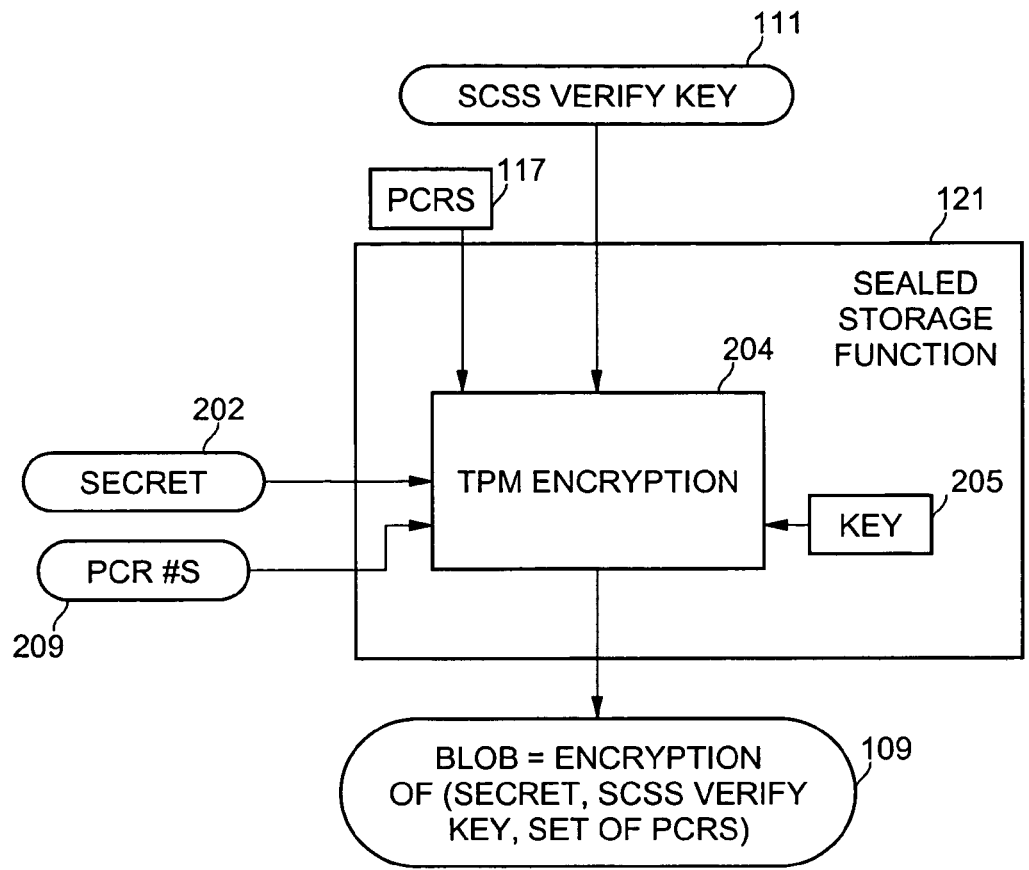
FIG. 6 is a diagram illustrating encryption of a blob according to another embodiment of the present invention.

In another embodiment of the present invention as shown in FIG. 6, a blob with verified PCRs may be used. To form a blob with verified PCRs, the sealed storage function 121 of the TPM would be given a secret 202, a set of PCRs 209, and a verification key $SCSS_{VERIFY}$ 111. The TPM would encrypt all of these together to form the blob 109.

Figure 7:
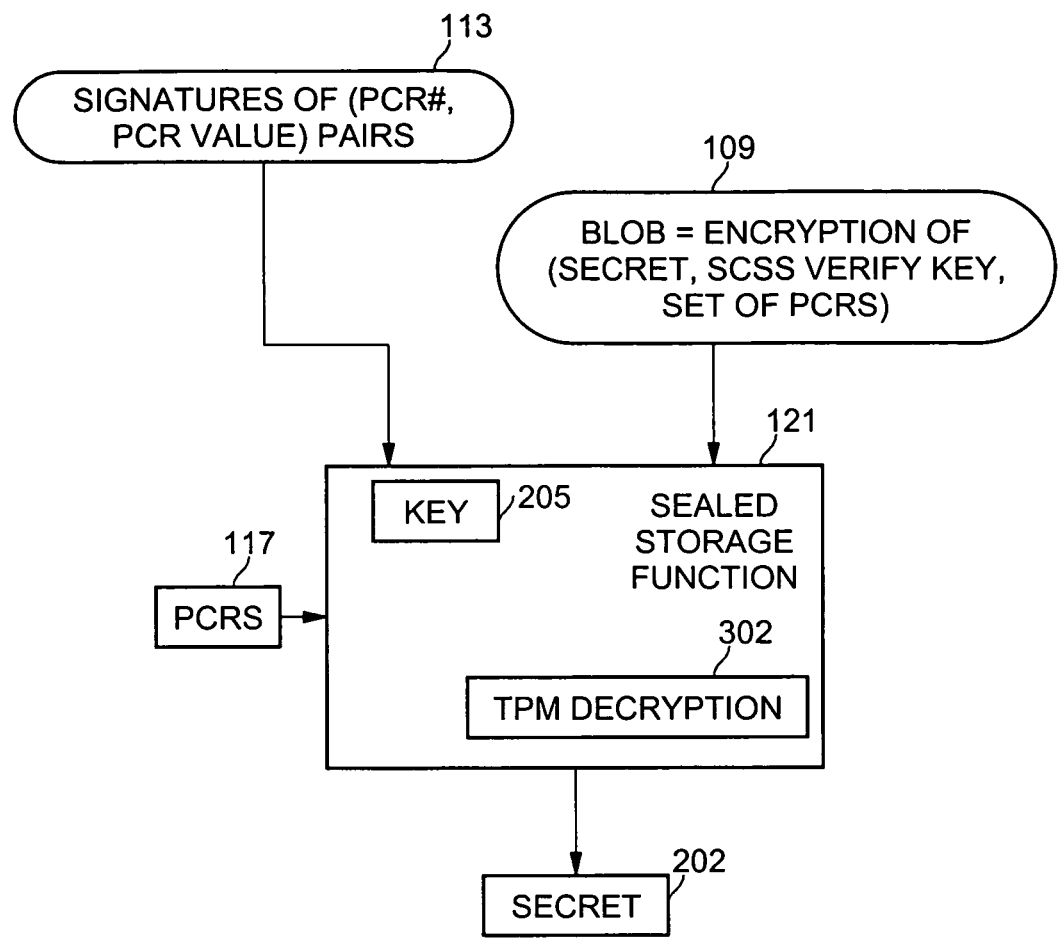
FIG. 7 is a diagram illustrating decryption of a blob as generated by the process shown in FIG. 6 according to an embodiment of the present invention.

FIG. 7 is a diagram illustrating decryption of a blob with verified PCRs generated by the process shown in FIG. 6 according to another embodiment of the present invention. When a TPM decryption component 302 of the sealed storage function 121 of the TPM is given a blob with verified PCRs 109, and signatures of PCR values 113, the TPM decrypts the blob using key 205 and extracts the $SCSS_{VERIFY}$ key contained in the blob. The TPM then checks that for each PCR specified in the blob, there is a valid signature verified using the $SCSS_{VERIFY}$ for that PCR with the current value in the PCR in the TPM. If all of the signatures validate for all of the PCRs listed, then the secret is output. If any one of the PCR values does not match, then the blob is rejected.

Figure 8:
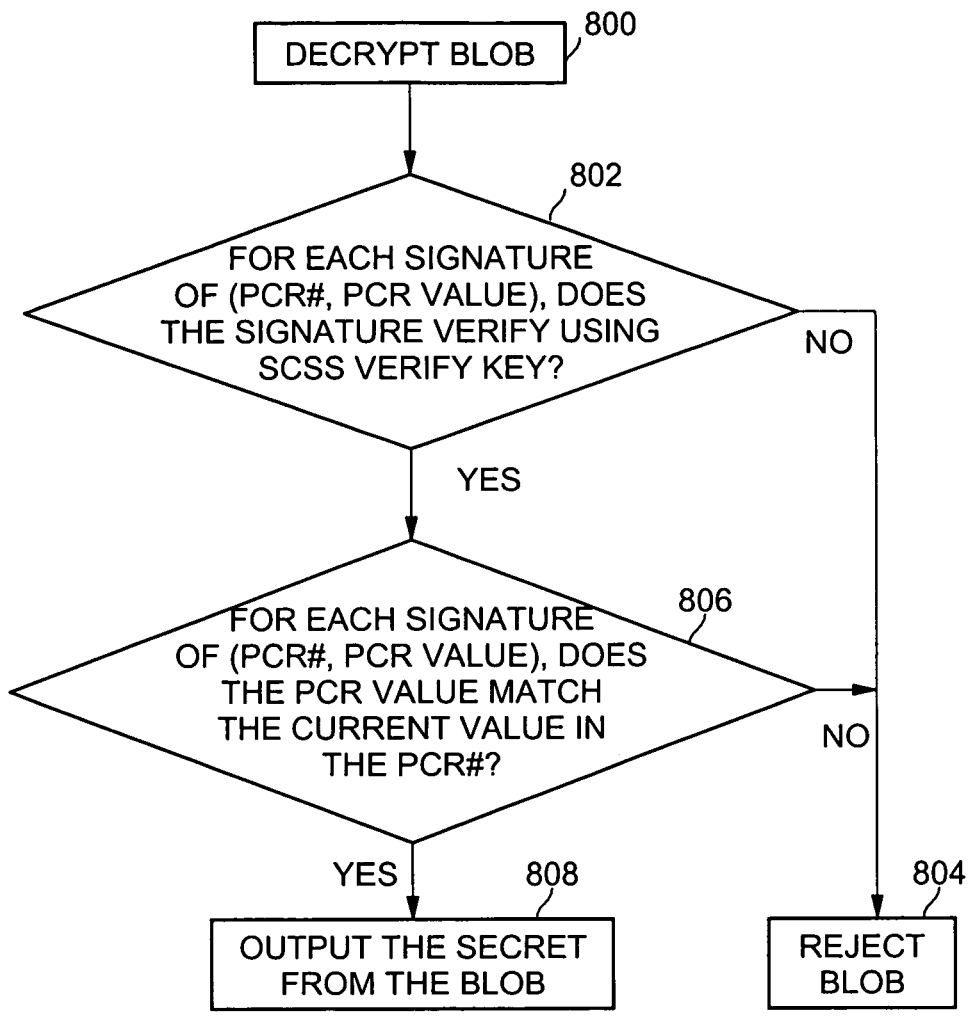
FIG. 8 is a flow diagram illustrating blob verification processing for a blob generated by the process of FIG. 6 according to another embodiment of the present invention.

FIG. 8 is a flow diagram illustrating blob verification processing for a blob with verified PCRs generated by the process shown in FIG. 6 according to an embodiment of the present invention. This processing may be accomplished by TPM decryption module 302 of the sealed storage function of the TPM as part of blob decryption shown in FIG. 7. The software component that needs to obtain the secret from the blob would need to have obtained the signatures for the (PCR identifier, value) pairs that are in the blob signed by the private key corresponding to the public PVK. A software component may send a blob, together with signatures for PCR values to the TPM with a request to release the secret from the blob. At block 800, the received encrypted blob may be decrypted by the TPM decryption component of the sealed storage of the TPM using key 205. At block 802, for each signature of a PCR identifier and PCR value pair, the signature may be checked to determine if it verifies using the $SCSS_{VERIFY}$ key. If any of the signatures do not verify using the $SCSS_{VERIFY}$ key from the blob, then the blob may be rejected at block 804 and the request to obtain the secret is denied. If all signatures are verified, then processing continues with block 806. At block 806, for each signature of a PCR identifier and PCR value pair, the TPM decryption module obtains the current PCR values stored in the PCRs 117 and verifies that signatures were received for all of the PCR values. If each received, signed PCR value matches the current stored PCR value from the corresponding PCR 117, then the secret may be output from the blob and returned to the request at block 808. When the PCR values match, this means that the environment is one that has been signed by the $SCSS_{SIGN}$ key. Otherwise, if any received, signed PCR value does not match the current stored PCR value, the blob may be rejected at block 804, and the request to obtain the secret is denied.

Figure 9:
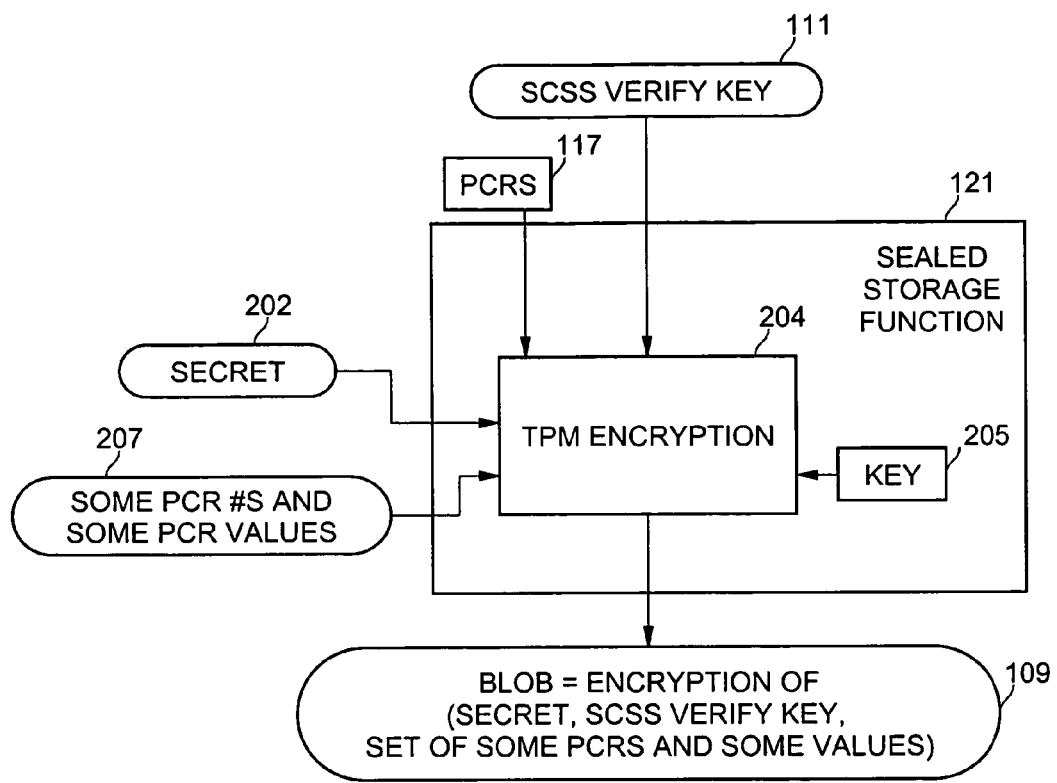
FIG. 9 is a diagram illustrating encryption of a blob according to another embodiment of the present invention.

In yet another embodiment as shown in FIG. 9, a blob with some combination of different types of PCRs such as those shown in FIGS. 2, 4, and 6 may be used. To form a blob with some verified PCRs, for example, the sealed storage function 121 of the TPM would be given a secret 202, a verification key $SCSS_{VERIFY}$ 111, and a set of some PCRs and values for some of the PCRs 207, which the TPM would encrypt to form the blob 109.

Figure 10:
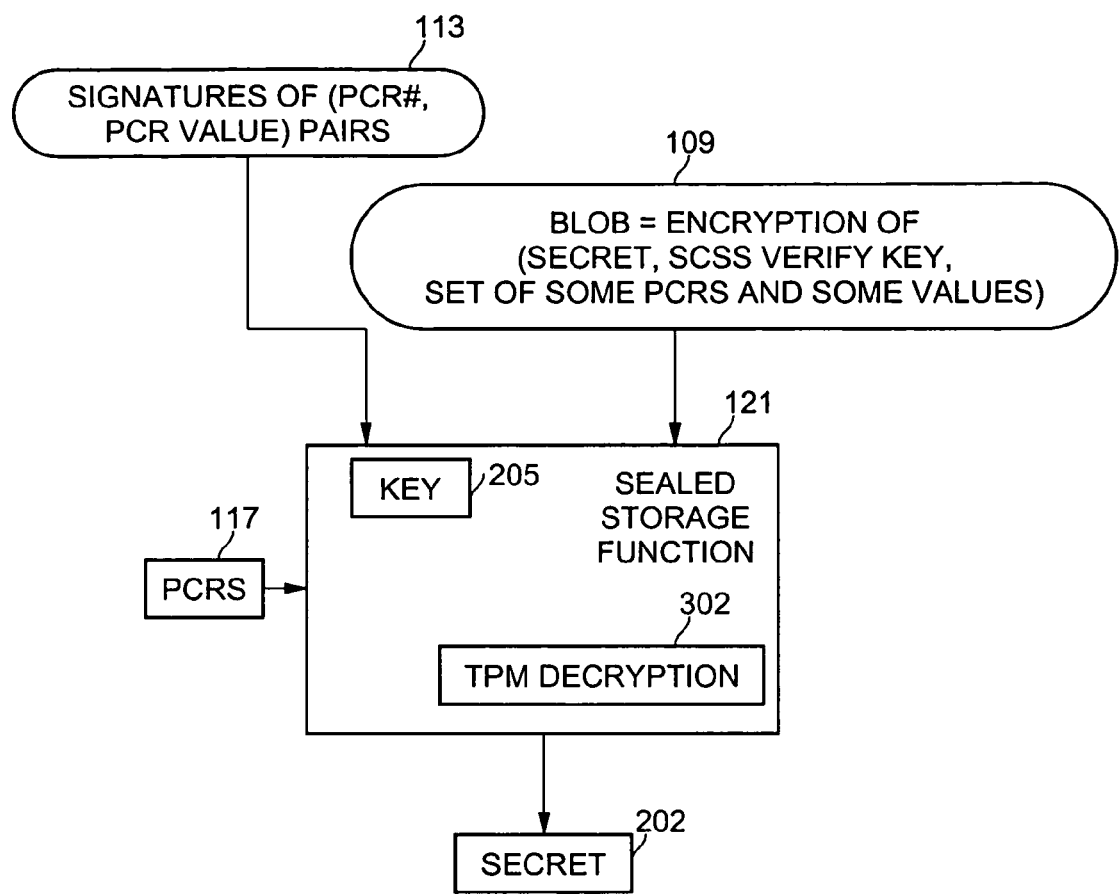
FIG. 10 is a diagram illustrating decryption of a blob as generated by the process shown in FIG. 9 according to an embodiment of the present invention.

FIG. 10 is a diagram illustrating decryption of a blob with some combination of PCRs generated by the process shown in FIG. 9 according to another embodiment of the present invention. When a TPM decryption component 302 of the sealed storage function 121 of the TPM is given a blob with some combination of PCRs 109, and signatures of PCR values 113, the TPM decrypts the blob using key 205 and extracts the $SCSS_{VERIFY}$ key contained in the blob. The TPM then checks that for each PCR specified in the blob, there is a valid signature verified using the $SCSS_{VERIFY}$ for that PCR with the current value in the PCR in the TPM. If all of the signatures validate for all of the PCRs listed, then the secret is output. If any one of the PCR values does not match, then the blob is rejected.

A PCR may contain the end result of a chain of hashes of values. Embodiments of the present invention easily extend to this case by having a signature by the $SCSS_{SIGN}$ key on each of the individual hashes in the chain of hashes.

In another embodiment of the present invention, the technique described above may be extended by having possibly different signature keys for different PCRs. In this embodiment, the blob would contain a list of tuples (PCR identifier, $SCSS_{VERIFY}$). Then to verify such a blob, the TPM would receive a value for each PCR, and a signature for the (PCR identifier, PCR value) pair that can be verified by the $SCSS_{VERIFY}$ key in the tuple for that PCR identifier.

In another embodiment of the present invention, the technique described above may be extended by having different signature keys for different hashes in an extended hash chain. For example, multiple data items for component measurements may be concatenated together into each PCR. This may be accomplished by an extended hash function of the current PCR value for a specific PCR and a new hash value for another component. This creates a chain of hashes. Any individual PCR value may represent many components. This would allow more components in the processing system to be measured than PCRs in the TPM. A blob could specify the $SCSS_{VERIFY}$ keys that could be used to verify the signatures for the values in the hash chain.

By using this method, migration becomes easier. If a software component produced by company XYZ is updated, and an application is not aware of this fact, then when the application launches, it will no longer have access to its sealed secret. A check of the TPM would reveal what has changed. The software component may come with a signature of the software component produced using XYZ's signature key. That key could have been the one specified by the blob. Alternatively, the blob may have specified a signature key of the corporate IT department, for example, or some other certifying authority. In this case, the application would contact this certifying authority, find out if this new software component is trusted, and if it is, get the signature for the new software component. There would be no need to migrate the secret to a new environment. This new signature would just need to be submitted with the blob.

In another embodiment, a certificate chain may be used. The definition of the blob with verified PCRs remains the same (i.e., contained PCR identifiers and a $SCSS_{VERIFY}$). For verification of the blob, each PCR value may be verified by a key which has a certificate which can be verified using the $SCSS_{VERIFY}$ key in the blob. This "certificate chain" could be longer if needed.

Although the operations described herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A method of verifying an encrypted blob of data passed to a sealed storage function in a trusted platform module (TPM) of a computing platform by a software component, comprising:

receiving the encrypted blob of data from the software component;

receiving a digital signature for each of a set of platform configuration register (PCR) identifier and PCR value pairs from the software component, wherein each received digital signature is provided by a service associated with the software component and each PCR identifier and PCR value pair represents a measurement of the computing environment;

decrypting the encrypted blob of data using a TPM key to form a decrypted blob of data, the decrypted blob of data-comprising a secret and a verification key, wherein the verification key is provided by the service associated with the software component;

for each received digital signature:
determining whether each received digital signature verifies using the verification key and rejecting the decrypted blob of data if any received digital signature is not verified, and determining whether each received PCR value matches a current value stored in a corresponding PCR in the TPM and rejecting the decrypted blob of data if any corresponding pair of PCR values do not match;

outputting the secret from the decrypted blob of data when the decrypted blob of data has not been rejected; and if at least one measurement of the computing platform has changed since the secret was sealed in the blob, obtaining a new signature from a certifying authority and submitting the new signature to the TPM to allow the software component access to the secret if the software component is entitled to access the secret without migrating the secret.

2. The method of claim 1, wherein the encrypted blob of data is formed by a TPM encryption module of the sealed storage function of the TPM by encrypting the secret and the verification key, using the TPM key.

3. The method of claim 1, wherein the received PCR identifier and PCR value pairs were signed using a private key corresponding to the verification key.

4. The method of claim 1, wherein the PCR identifiers specify a combination of keyed PCRs and verified PCRs.

5. An article comprising: a non-transitory tangible machine accessible medium containing instructions, which when executed, result in verifying an encrypted blob of data passed to a sealed storage function in a trusted platform module (TPM) of a computing platform by a software component, by
  receiving the encrypted blob of data from the software component;
  receiving a digital signature for each of a set of platform configuration register (PCR) identifier and PCR value pairs from the software component, wherein each received digital signature is provided by a service associated with the software component and each PCR identifier and PCR value pair represents a measurement of the computing environment;
  decrypting the encrypted blob of data using a TPM key to form a decrypted blob of data, the decrypted blob of data-comprising a secret and a verification key, wherein the verification key is provided by the service associated with the software component;
  for each received digital signature:
    determining whether each received digital signature verifies using the verification key and rejecting the decrypted blob of data if any received digital signature is not verified, and
    determining whether each received PCR value matches a current value stored in a corresponding PCR in the TPM and rejecting the decrypted blob of data if any corresponding pair of PCR values do not match;
  outputting the secret from the decrypted blob of data when the decrypted blob of data has not been rejected; and
  if at least one measurement of the computing platform has changed since the secret was sealed in the blob, obtaining a new signature from a certifying authority and submitting the new signature to the TPM to allow the software component access to the secret if the software component is entitled to access the secret without migrating the secret.

6. The article of claim 5, wherein the encrypted blob of data is formed by a TPM encryption module of the sealed storage function of the TPM by encrypting the secret and the verification key using the TPM key.

7. The article of claim 5, wherein the received PCR identifier and PCR value pairs were signed using a private key corresponding to the verification key.

8. The article of claim 5, wherein the PCR identifiers specify a combination of keyed PCRs and verified PCRs.

9. A trusted platform module (TPM) of a computing platform comprising:
  a plurality of platform configuration registers (PCRs), each PCR storing a PCR value;
  a sealed storage function, the sealed storage function comprising a TPM key and a decryption module, the decryption module configured to verify an encrypted blob of data stored by the sealed storage function and passed to the TPM by a software component by
    receiving the encrypted blob of data from the software component;
    receiving a digital signature for each of a set of platform configuration register (PCR) identifier and PCR value pairs from the software component, wherein each received digital signature is provided by a service associated with the software component and each PCR identifier and PCR value pair represents a measurement of the computing environment;
    decrypting the encrypted blob of data using the TPM key to form a decrypted blob of data, the decrypted blob of data comprising a secret and a verification key, wherein the verification key is provided by the service associated with the software component;
    for each received digital signature:
      determining whether each received digital signature verifies using the verification key and rejecting the decrypted blob of data if any received digital signature is not verified, and
      determining whether each received PCR value matches a current value stored in a corresponding PCR in the TPM and rejecting the decrypted blob of data if any corresponding pair of PCR values do not match;
    outputting the secret from the decrypted blob of data when the decrypted blob of data has not been rejected; and
    if at least one measurement of the computing platform has changed since the secret was sealed in the blob, obtaining a new signature from a certifying authority and submitting the new signature to the TPM to allow the software component access to the secret if the software component is entitled to access the secret without migrating the secret.

10. The trusted platform module of claim 9, wherein the sealed storage function further comprises an encryption module, and wherein the encrypted blob of data is formed by the encryption module by encrypting the secret and the verification key using the TPM key.

11. The trusted platform module of claim 9, wherein the received PCR identifier and PCR value pairs were signed using a private key corresponding to the verification key.

12. The trusted platform module of claim 9, wherein the PCR identifiers specify a combination of keyed PCRs and verified PCRs.

13. The trusted platform module of claim 9, wherein each PCR uses a different signature key and verification key pair.

14. The trusted platform module of claim 9, wherein each PCR stores a chain of hashes for a plurality of software components and the blob specifies a plurality of verification keys used to verify the digital signatures for values in the chain of hashes.

15. A method of generating an encrypted a blob of data by an encryption module of a sealed storage function of a trusted platform module (TPM) in a computing platform, the TPM including a plurality of platform configuration registers (PCRs), comprising:
  accepting a secret, a verification key, a set of PCRs comprising a set of PCR identifiers, and a digital signature for each PCR in the set of PCRs from a software component, wherein each digital signature and the verification key are provided by a service associated with the software component;

encrypting the secret, the verification key, and the set of PCRs using a TPM key stored in the sealed storage function to form the encrypted blob of data, the encrypted blob of data sealing the secret to the computing environment represented by the PCR; and if at least one measurement of the computing platform has changed since the secret was sealed in the blob, obtaining a new signature from a certifying authority and submitting the new signature to the TPM to allow the software component access to the secret if the software component is entitled to access the secret without migrating the secret.

16. The method of claim 15, wherein each PCR uses a different signature key and verification key pair.

17. The method of claim 15, wherein each PCR stores a chain of hashes for a plurality of software components of the computing environment and the blob specifies a plurality of verification keys used to verify digital signatures for values in the chain of hashes.

18. An article comprising: a non-transitory tangible machine accessible medium containing instructions, which when executed, result in generating an encrypted a blob of data by an encryption module of a sealed storage function of a trusted platform module (TPM) in a computing platform, the TPM including a plurality of platform configuration registers (PCRs), by:

accepting a secret, a verification key, a set of PCRs comprising a set of PCR identifiers, and a digital signature for each PCR in the set of PCRs from a software component, wherein each digital signature and the verification key are provided by a service associated with the software component;

encrypting the secret, the verification key, and the set of PCRs using a TPM key stored in the sealed storage function to form the encrypted blob of data, the encrypted blob of data sealing the secret to the computing environment represented by the PCR; and if at least one measurement of the computing platform has changed since the secret was sealed in the blob, obtaining a new signature from a certifying authority and submitting the new signature to the TPM to allow the software component access to the secret if the software component is entitled to access the secret without migrating the secret.

19. The article of claim 18, wherein each PCR uses a different signature key and verification key pair.

20. The article of claim 19, wherein each PCR stores a chain of hashes for a plurality of software components of the computing environment and the blob specifies a plurality of verification keys used to verify digital signatures for values in the chain of hashes.

21. A method for securely recording information about a computing environment of a processing system comprising:

computing a hash value of a software component of the computing environment;

computing a signature of the hash value;

sending the hash value, the signature, and a verification key to a trusted platform module (TPM) in the processing system, wherein the verification key and the signature are provided by a service associated with the software component;

verifying that first signature is a valid signature of the hash value using the verification key; and recording the verification key; and if a measurement of the computing platform changes after the secret is sealed in a blob, obtaining a new signature from a certifying authority and submitting the new signature to the TPM to allow the software component access to the secret if the software component is entitled to access the secret without migrating the secret.

22. The method of claim 21, wherein the signature is stored in a platform configuration register (PCR) of the TPM.

23. The method of claim 21, wherein recording the verification key comprises storing a hash of the verification key.

24. The method of claim 21, wherein recording the verification key comprises extending a stored value by a hash of the verification key and storing a result of the extending.

* * * * *